(12) United States Patent
Giebel

(10) Patent No.: US 6,437,248 B1
(45) Date of Patent: Aug. 20, 2002

(54) CABLE, IN PARTICULAR UNDERWATER CABLE

(75) Inventor: Wolfgang Giebel, Planegg (DE)

(73) Assignee: Norddeutsche Seekabelwerke GmbH & Co. KG, Nordenham (DE)

( * ) Notice: Subject to any disclaimer, the term of this patent is extended or adjusted under 35 U.S.C. 154(b) by 0 days.

(21) Appl. No.: 09/521,705

(22) Filed: Mar. 9, 2000

(30) Foreign Application Priority Data

Mar. 10, 1999 (DE) .......................... 199 10 708
Jun. 22, 1999 (DE) .......................... 199 28 506

(51) Int. Cl.⁷ ..................... H01B 7/00; H01B 7/36
(52) U.S. Cl. ......................... 174/110 R; 174/112
(58) Field of Search ................ 174/112, 110 R, 174/36, DIG. 8

(56) References Cited

U.S. PATENT DOCUMENTS

| | | | | |
|---|---|---|---|---|
| 2,138,378 A | * | 11/1938 | Johnson ........................ | 18/13 |
| 2,316,149 A | * | 4/1943 | Bates ........................... | 18/59 |
| 2,939,271 A | * | 6/1960 | Nadel ........................... | 57/140 |
| 3,551,542 A | * | 12/1970 | Perrone ........................ | 264/166 |
| 3,663,359 A | * | 5/1972 | Braim .......................... | 162/105 |
| 4,498,812 A | * | 2/1985 | Lanfranconi et al. ....... | 405/168 |
| 4,636,017 A | * | 1/1987 | Boteler ........................ | 339/17 F |
| 4,997,994 A | * | 3/1991 | Andrews et al. ............. | 174/112 |
| 5,049,721 A | * | 9/1991 | Parnas et al. ............... | 219/121.68 |
| 5,281,764 A | * | 1/1994 | King et al. .................. | 174/112 |
| 5,390,619 A | * | 2/1995 | Miller ........................... | 114/243 |
| 5,862,774 A | * | 1/1999 | Moss ............................ | 116/200 |
| 5,911,450 A | * | 6/1999 | Shibata et al. .............. | 29/407.04 |

FOREIGN PATENT DOCUMENTS

| | | | | |
|---|---|---|---|---|
| CH | 675982 A5 | 11/1990 | | |
| DE | 832626 | * | 2/1952 | |
| DE | 832 626 | | 2/1952 | |
| DE | 1 876 066 | | 7/1963 | |
| DE | 1 896 567 | | 7/1964 | |
| DE | 1 640 097 | | 6/1972 | ............ H01B/7/36 |
| DE | 2 207 710 | | 8/1973 | |
| DE | 28 55 680 A1 | | 7/1980 | ............ H01B/7/36 |
| DE | 293 909 | | 9/1991 | ............ H01B/7/36 |
| DE | 42 09 830 A1 | | 9/1993 | ............ G02B/6/44 |
| DE | 44 34 618 A1 | | 4/1996 | ............ H01B/7/14 |
| DE | 198 49 543 A1 | | 4/1999 | |
| DE | 198 12 314 A1 | | 9/1999 | ............ H01B/7/36 |
| EP | 0 321 091 A2 | | 6/1989 | |
| EP | 0 829 884 A1 | | 3/1998 | |
| FR | 2 746 930 A1 | | 10/1997 | |
| JP | 62105109 | | 5/1987 | |
| JP | 6209404 | | 9/1987 | |
| JP | 03090688 A | * | 4/1991 | ............ D07B/1/16 |
| JP | 05166283 A | * | 6/1993 | ............ H02G/1/10 |

OTHER PUBLICATIONS

DE–AN: K 9504 vom 02.04.51 –PA157385.
Phohaska, Klaus, Kennzeichnungen auf und in Kabeln und Leitungen, etz Bd. 100 (1979) Heft 7/8, S. 328–333.
Copy of German Patent Office Search, Jan. 26, 2000.
"Europaischer Recherchenbericht" (European Patent Office Search Results).

\* cited by examiner

*Primary Examiner*—Dean A. Reichard
*Assistant Examiner*—William H. Mayo
(74) *Attorney, Agent, or Firm*—Technoprop Colton LLC

(57) ABSTRACT

The submarine cable (10) having on an outer sheath, (11) a marking provided by at least one longitudinal strip (13), which stands out with high contrast from the black color of the outer sheath (11) by a lighter color, in particular yellow, and, as a result, is more easily visible on television pictures.

15 Claims, 5 Drawing Sheets

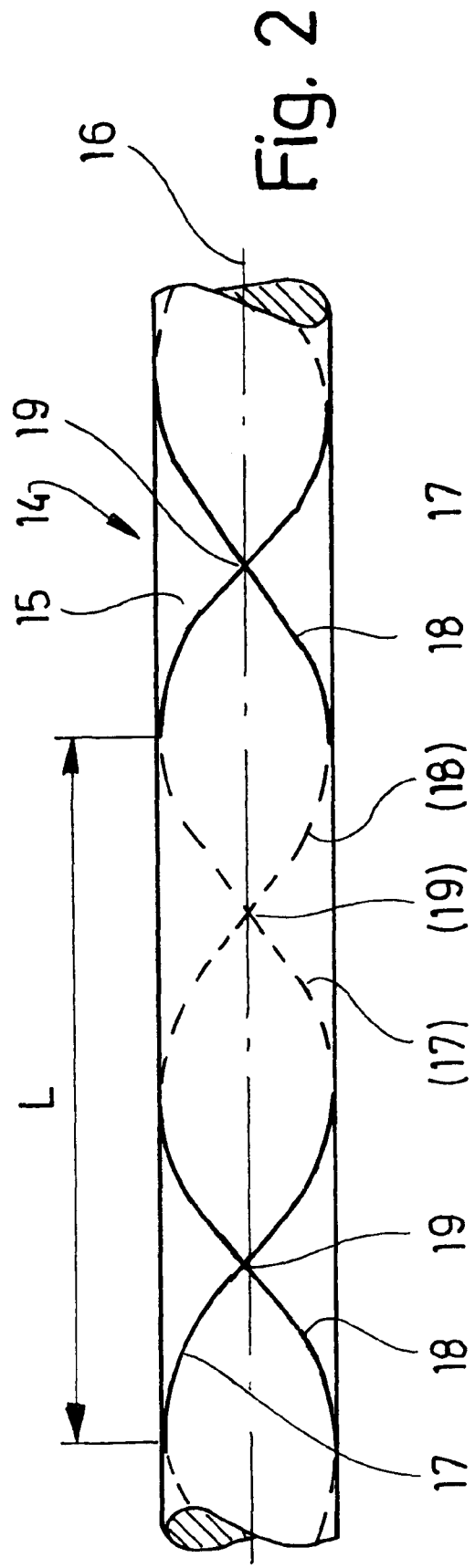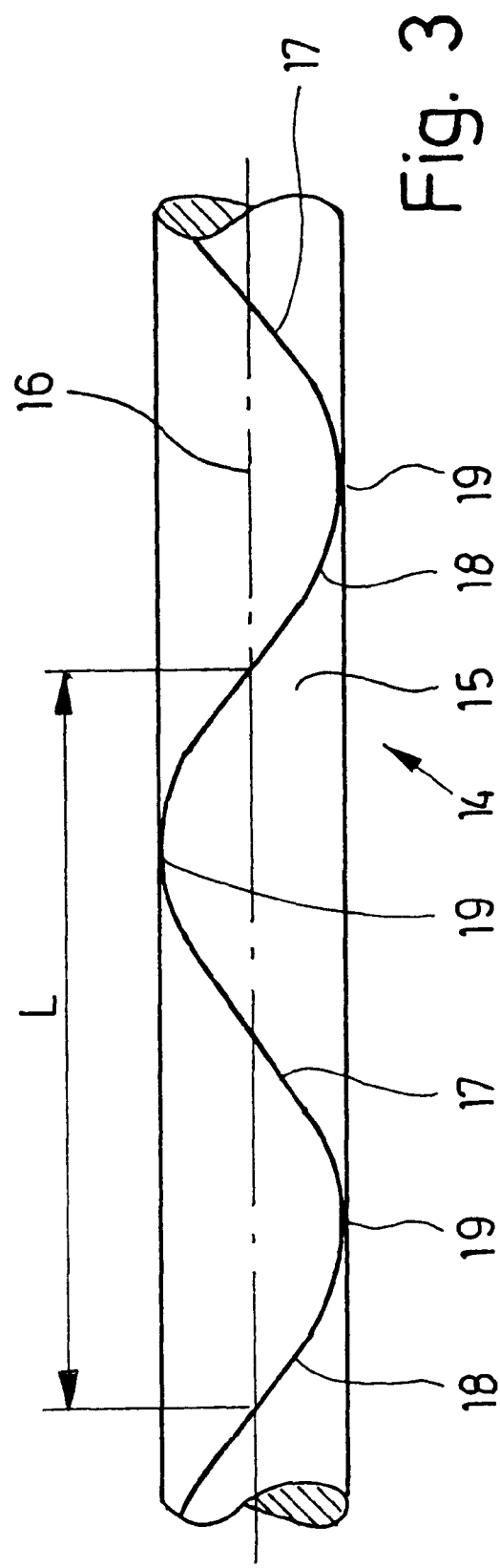

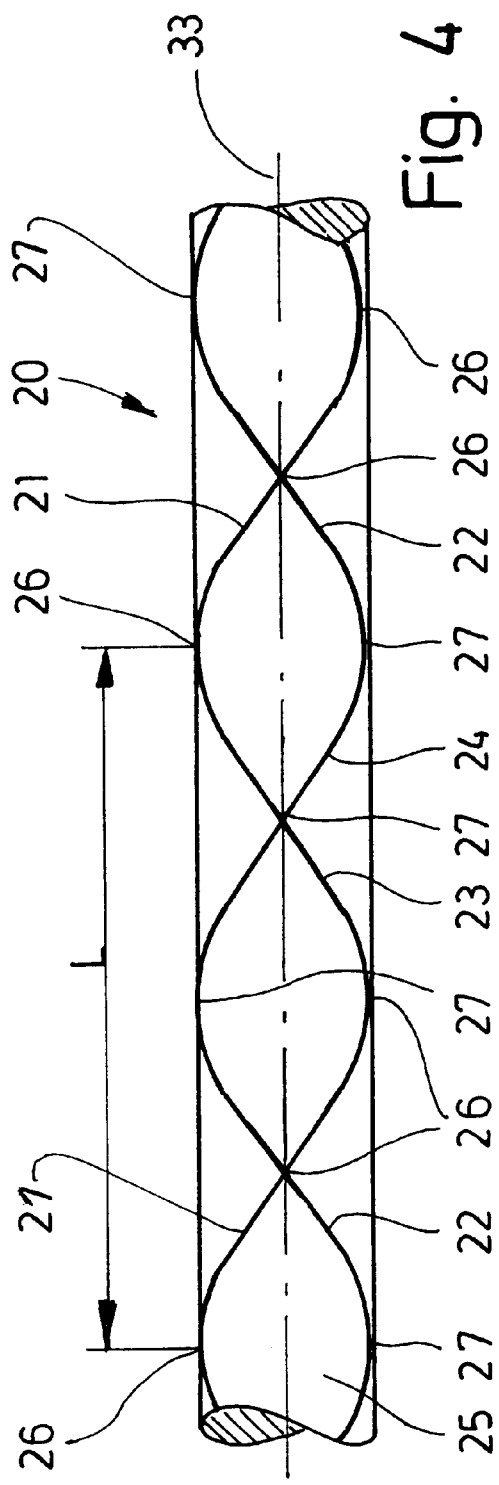
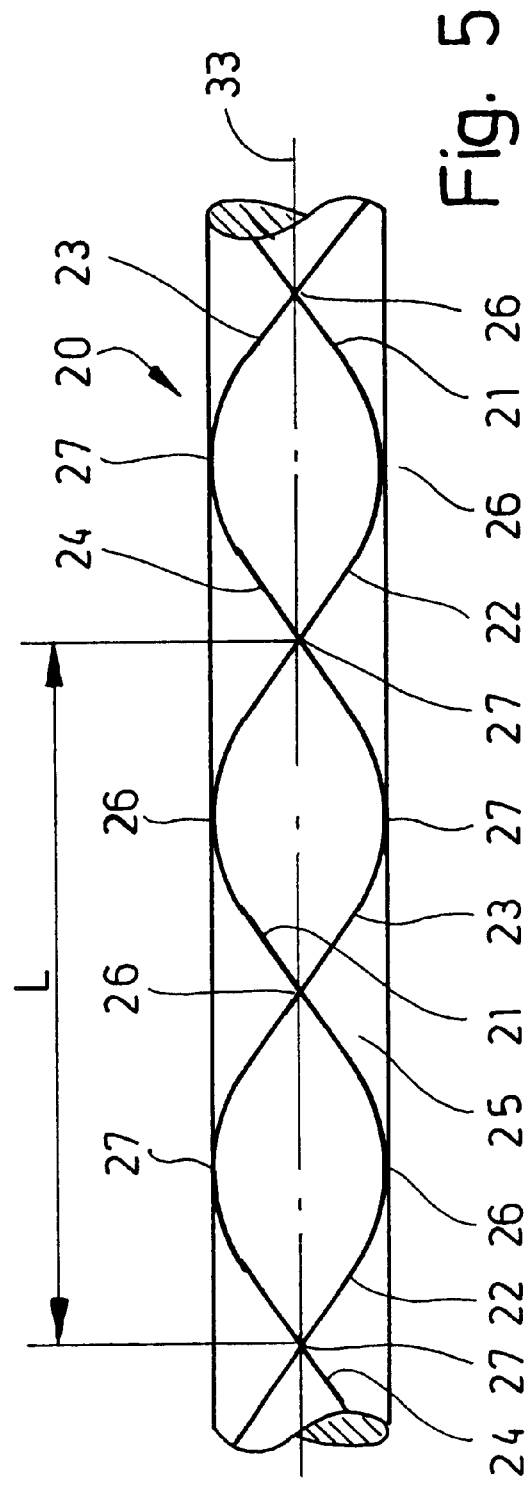

CABLE, IN PARTICULAR UNDERWATER CABLE

BACKGROUND OF THE INVENTION

The invention concerns a cable, in particular an underwater cable, with a cable core having at least one conductor, and an outer sheath.

PRIOR ART

Underwater cables (so-called submarine cables) must be observed during laying, for inspection purposes and for tracing any defects. This takes place under water with remote-controlled cameras. The pictures taken by the cameras under water, in particular at great depths, often allow the underwater cable to be made out only with difficulty, in particular whenever it has a customary black or dark outer sheath. This makes it difficult in particular to locate defective underwater cables.

BRIEF SUMMARY OF THE INVENTION

Setting out from the above situation, the invention is based on the object of providing a cable, in particular an underwater cable (submarine cable), which can be made out well under water, even at great depths.

A cable serving to achieve this object, in particular an underwater cable or submarine cable, has the features of claim 1. At least one externally visible marking of a different color on the outer sheath makes the cable more easily visible, in particular in the underwater area. The underwater cable according to the invention can be made out more easily on camera pictures, because the marking of a different color provides the outer sheath with greater contrast.

The marking can be formed in a wide variety of ways. The marking preferably consists of one or more strips or lines extending continuously in the longitudinal direction of the outer sheath of the cable and preferably extending spirally around the cable. The marking comprising one or more spiral longitudinal strips or longitudinal lines on the outer sheath has the effect that the marking is always visible, irrespective of from which side the cable is viewed. Since submarine cables turn about their longitudinal axis during laying, the longitudinal strips or longitudinal lines likewise running spirally around the longitudinal axis of the submarine cable represent a marking that is virtually always visible.

It is alternatively also conceivable to form the marking by transverse strips or transverse lines running in a cross-sectional direction around the cable. These are then virtually endless, colored rings around the outer sheath. They are also always visible, irrespective of any turning of the cable. Like the abovementioned longitudinal lines or longitudinal strips extending spirally around the cable, the peripheral transverse strips or transverse lines have the advantage that turning of the submarine cable during laying does not become visible and as a result does not disturb the viewer.

It is likewise conceivable to form the marking from straight longitudinal strips or longitudinal lines. In order that a straight longitudinal strip or longitudinal line is always visible in each case, a corresponding number of longitudinal strips or longitudinal lines are arranged evenly distributed on the circumference of the outer sheath. The longitudinal strips or longitudinal lines or transverse strips or transverse lines can also be produced from at least one series of two-dimensional formations following one another at intervals. The two-dimensional formations may have any desired base areas, and in particular be round, elliptical, square or rectangular. Similarly, the intervals between the two-dimensional formations may be as desired.

Finally, it is also conceivable to provide the entire outer sheath with a marking comprising dots of any desired shape. In this case, the dots are arranged in a uniform grid, which preferably extends over the entire circumference of the outer sheath. Such a grid also has the advantage that the marking is always visible and turns of the submarine cable during laying do not become evident and do not in this case detract from the observation of laying.

Any type of marking can be formed by a dye sprayed or printed onto the outer sheath after it has been produced. For this purpose, a dye which is permanently resistant to sea water is used. It is also conceivable, after applying the dye forming the marking, to provide the entire outer sheath with a transparent protective layer, which also covers the colored marking.

It is also possible to form the marking from a plastic of a different color during the production of the outer sheath. The outer sheath is then made up of differently colored plastic materials. For example, this can be achieved by coextrusion of the outer sheath or by sintering the plastic of a different color onto the surface of the outer sheath. The types of marking mentioned then have virtually the same sea-water resistance as the outer sheath.

According to a preferred development of the invention, the respective marking has a lighter color than the outer sheath. It is also advantageous if the lighter color of the marking has fluorescent properties. As a result, the marking of the submarine cable becomes visible even at great depths if searchlights of an underwater camera shine on it.

In the case of submarine cables with a usually black outer sheath, a yellow color, in particular a fluorescent yellow color, which offers easily visible contrast together with the black color of the outer sheath, is preferably chosen for the lighter color of the marking.

The marking may also be formed by mixing color particles or color pigments in with the raw material of the plastic for forming the outer sheath. Such an outer sheath then has an essentially regular distribution of colored locations, in particular small dots. The embedding of the color particles or color pigments in the plastic material for forming the outer sheath ensures a permanent bonding of the marking to the submarine cable.

In an alternative development of the submarine cable according to the invention, the marking is formed by a netting applied to the outer sheath. The netting surrounds the entire outer sheath and extends uninterruptedly in the longitudinal direction of the submarine cable. The netting produces on the outside of the outer sheath of the submarine cable peripheral transverse strands and rectilinear longitudinal strands with preferably a round cross section, although other cross sections, for example square, are also conceivable. If the netting is of a different color, the crossing longitudinal and transverse strands form the marking.

BRIEF SUMMARY OF THE DRAWINGS

Preferred exemplary embodiments of the cable according to the invention are explained in more detail below with reference to the drawing, in which:

FIG. 2 shows a side view of a portion of a submarine cable according to a second exemplary embodiment of the invention, FIG. 3 shows the submarine cable of FIG. 2 in a side view turned through 90°, FIG. 4 shows a side view of a portion of a submarine cable according to a third exemplary embodiment of the invention, FIG. 5 shows a side view of the submarine cable of FIG. 4, turned through 90° with respect to FIG. 4.

DETAILED DESCRIPTION OF THE PREFERRED EMBODIMENTS

The figures show cables for underwater use, namely submarine cables of any desired construction. In particular, the submarine cables may have in the interior a core of any desired construction. For example, the core may have both electrical conductors and optical waveguides or combinations of the two. In addition, the core has at least one armoring or reinforcement for protection against mechanical influences. The core with the reinforcement or armoring is surrounded by a closed outer sheath, which consists essentially of plastic. The outer sheath is usually black.

Figure 1:
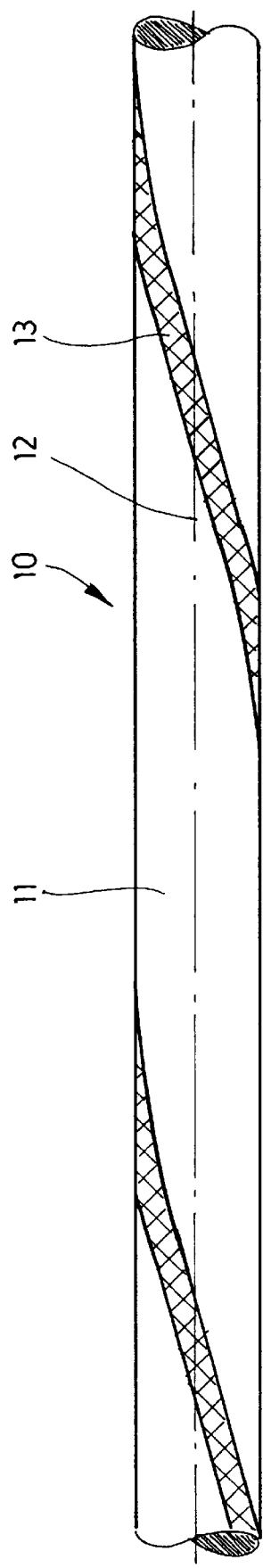
FIG. 1 shows a portion of a submarine cable in a side view.

FIG. 1 shows a submarine cable 10, the outer sheath 11 of which is provided with an externally visible marking. In the exemplary embodiment shown, the marking is formed by a longitudinal strip 13 running spirally around the outer sheath 11 in the longitudinal direction, in other words along the longitudinal centre axis 12 of the submarine cable 10. The single longitudinal strip 13 in the exemplary embodiment of FIG. 1 has, depending on the diameter of the submarine cable 10, a width of between 1 and 5 mm. The longitudinal strip 13 preferably has a width which corresponds approximately to one-quarter to one-fifth of the diameter of the submarine cable 10. In the exemplary embodiment shown, the pitch of the spiral helix of the longitudinal strip 13 around the submarine cable 10 is chosen such that, over a length of the submarine cable 10 which is approximately three to ten times, preferably approximately eight times, the diameter of the said cable, the longitudinal strip 13 has run once around the outer sheath 11 of the submarine cable 10.

FIGS. 2 and 3 show a submarine cable 14 according to a second exemplary embodiment of the invention. The internals of the submarine cable 14—which may be of any desired construction—are not represented in any more detail in the figures mentioned (or in any of the other figures). Only the outer sheath 15 with markings according to the invention is shown. In the present exemplary embodiment as well, the marking is formed by longitudinal strips running in a serpentine manner around the outer sheath 15 along the longitudinal centre axis 16, to be precise two longitudinal strips 17 and 18. For reasons of simple representation, the longitudinal strips 17 and 18 are only indicated by lines. In fact, they have a width which, depending on the diameter of the submarine cable 14, may be between 1 and 5 mm. It is also conceivable to make the individual longitudinal strips 17 and 18 of different widths.

The two longitudinal strips 17 and 18 run in different directions around the outer sheath 15. While the longitudinal strip 17 snakes clockwise around the outer sheath 15, the longitudinal strip 18 runs anti-clockwise around the outer sheath 15. Both longitudinal strips 17 and 18 have the same pitch, which is indicated in FIGS. 2 and 3 by the dimension L. This means that, on a portion L of the submarine cable 14, the longitudinal strip 17 wraps once right around the submarine cable 14 in one direction and the longitudinal strip 18 wraps once right around the submarine cable 14 in the other direction.

The longitudinal strips 17 and 18, which follow an identical path, cross at common nodes 19, the intervals of which have half the dimension L of a complete revolution of the respective longitudinal strip 17 and 18 around the outer sheath 15.

The design and arrangement described of the longitudinal strips 17 and 18 on the submarine cable 14 have the effect that, depending on the viewing direction towards the side of the submarine cable 14, the two oppositely running longitudinal strips 17 and 18 have different paths. It can be seen from the representation in FIG. 2 that both longitudinal strips 17 and 18 are simultaneously visible in the same region of the length of the submarine cable 14. Between two successive visible portions of the longitudinal strips 17 and 18, both longitudinal strips 17 and 18 disappear entirely to the invisible rear side of the submarine cable 14. The length of this invisible region is half the length of one complete revolution of the respective longitudinal strip 17 and 18 around the submarine cable 14. If the submarine cable 14 represented in FIG. 2 is viewed from below, one of the two longitudinal strips 17 or 18 is always visible. The serpentine or sinusoidal path shown in the figure is thereby obtained. Thus, from certain views of the submarine cable 14, the two longitudinal strips 17 and 16 extending in opposite directions have the effect that either only a single longitudinal strip 17 or 18 is visible or both longitudinal strips 17, 18 are only partially visible.

FIGS. 4 and 5 show a third exemplary embodiment of a submarine cable 20, in which the marking has four longitudinal strips 21 to 24. The longitudinal strips 21 and 22 correspond to the longitudinal strips 17 and 18 of the exemplary embodiment of FIGS. 2 and 3. The longitudinal strips 21 and 22 become visible in the left-hand half of the dimension L of FIG. 4. Located invisibly behind them, with the same path, are the longitudinal strips 23 and 24. In the right-hand half of the dimension L in FIG. 4, the longitudinal strips 21 and 22 disappear invisibly to the rear side of the outer sheath 25 of the submarine cable 20. In this region, the longitudinal strips 23 and 24 appear visibly on the front side of the outer sheath 25. Behind the dimension L in FIG. 4, these strips disappear again to the rear side of the outer sheath 25 and the longitudinal strips 21 and 22 visibly reemerge.

The longitudinal strips 21 and 22 on the one hand and 23 and 24 on the other hand are all of the same design as one another. The longitudinal strips 21, 22, 23, 24 wrap around the outer sheath 25 in the direction of the longitudinal centre axis 32 of the submarine cable 20. The only difference that, at the upper (left-hand) node 26 in FIG. 4, the longitudinal strip 21 begins in one direction and the longitudinal strip 23 begins in another direction. Extending from the node 27 lying below it in FIG. 4 are the longitudinal strips 22 and 24, to be precise in such a way that they wrap around the submarine cable 20 in opposite directions. As a result, there are always two nodes 26 and 27 diametrically opposite one another on the outer sheath 25 of the submarine cable 20. The nodes 26 and 27 are always offset by the dimension L-quarter in the direction of the longitudinal centre axis 16 of the submarine cable 20 and also always turned through 90°.

The four longitudinal strips 21, 22, 23 and 24, which are of the same design and are just directed differently, or extend from different nodes 26 to 27, achieve the effect that the marking of the outer sheath 25 is continuously visible from every side of the submarine cable 20, to be precise with the same pattern, as clearly illustrated by FIGS. 4 and 5, which show the submarine cable 20 from two viewing directions respectively offset by 90°.

The longitudinal strips 21, 22, 23 and 24, again shown only as lines in FIGS. 4 and 5 for reasons of simplification, are in fact designed as wider strips, to be precise with a width of preferably 1 to 5 mm. In the case of relatively thick submarine cables 20, the strips may be even wider. The same also applies to the other exemplary embodiments of the invention. It is conceivable to make the individual longitudinal strips 21, 22, 23 and 24 of different widths.

Figure 6:
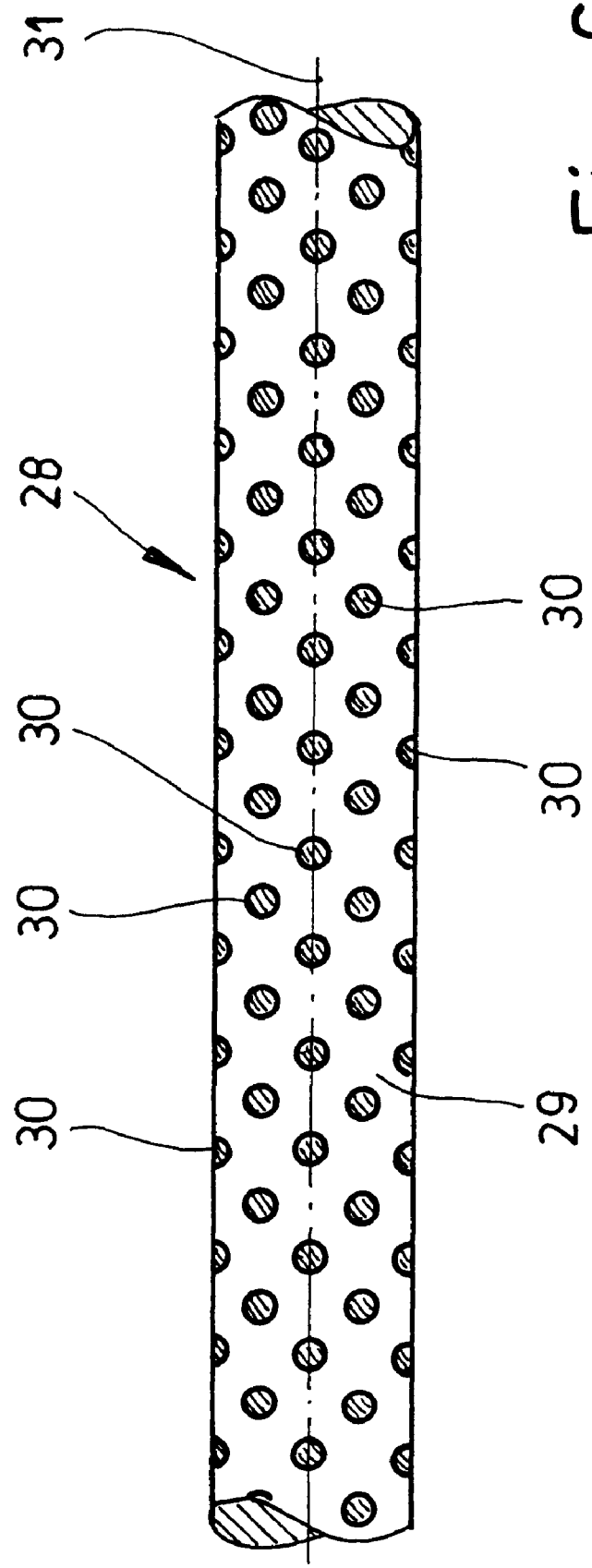
FIG. 6 shows a portion of a submarine cable according to a fourth exemplary embodiment of the invention.

FIG. 6 shows a fourth exemplary embodiment of a submarine cable 28. This submarine cable 28 has on an outer sheath 29 a marking comprising a multiplicity of round dots 30. The dots 30 are distributed uniformly over the entire length of the submarine cable 28 along its longitudinal centre axis 31 over the entire circumference of the outer sheath 29. For this purpose, in the exemplary embodiment shown, the dots 30 are arranged in a uniform grid. This is made up of a plurality of rows of dots 30, following one another at uniform intervals, the said rows extending parallel to the longitudinal centre axis 16 and the dots 30 of adjacent rows being offset by half the interval between pairs of dots 30, in other words are arranged such that they are staggered. The interval between neighbouring dots 30 is slightly greater than the diameter of the same. The dots 30, which are the same as one another, have in each case a diameter of preferably 1 to 10 mm. The interval between the dots 30 may also be greater than their diameter; preferably, the interval between the dots 30 is five to twenty times as great as their diameter.

While the outer sheaths of the submarine cables shown are black, the markings, in other words the longitudinal strips 13, 17, 18, 21, 22, 23, 24, or the dots 30, have a lighter color. The longitudinal strips 13, 17, 18, 21, 22, 23, 24 or the dots 30 are made yellow. This may be a shade of yellow, which has fluorescent or retro-reflective properties.

It is also conceivable to provide in particular the submarine cables 14 and 20 with a plurality of longitudinal strips 17, 18 or 21, 22, 23 and 24, respectively, as shown in FIGS. 1 to 5. The individual longitudinal strips 17, 18, 21, 22, 23 or 24 may also be provided with different colors, which however are to be significantly lighter than the black color of the outer sheaths. The dots 30 on the outer sheath 29 of the submarine cable 28 may also be of different colors.

The markings are continuously applied to the outer sheaths of the submarine cables while they are being produced, or are made in the outer sheaths. This may take place during or after the production of the respective outer sheath.

After the production of the respective outer sheath, the marking may be printed or sprayed onto the outside of the respective outer sheath in the form of longitudinal strips 13, 17, 18, 21, 22, 23, 24 or dots 30. In this case, the marking is formed from a coating of a corresponding color or from liquid plastic. The coating or the liquid plastic must be of such a nature that it adheres well to the outer sheaths and is indelible, even in salty sea water.

It is also conceivable to produce the marking by sintering onto the respective outer sheath. This also takes place preferably after the production of the outer sheath. In this case, the sintering-on can be performed while the outer sheath has not yet fully cured.

The marking may also be produced during the production of the respective outer sheath of the submarine cable, by the respective outer sheath being formed from plastics of different colors. Then the outer sheath is formed, for example by the coextrusion process, simultaneously from the black plastic and the differently colored, for example yellow, plastic for forming the marking, in particular the longitudinal strips 13, 17, 18, 21, 22, 23, 24.

The longitudinal strips 13, 17, 18, 21, 22, 23, 24 shown in FIGS. 1 to 5 extend continuously over the entire length of the respective submarine cable, in other words snake constantly, that is to say repeatedly or many times, around the outer sheath.

Figure 7:
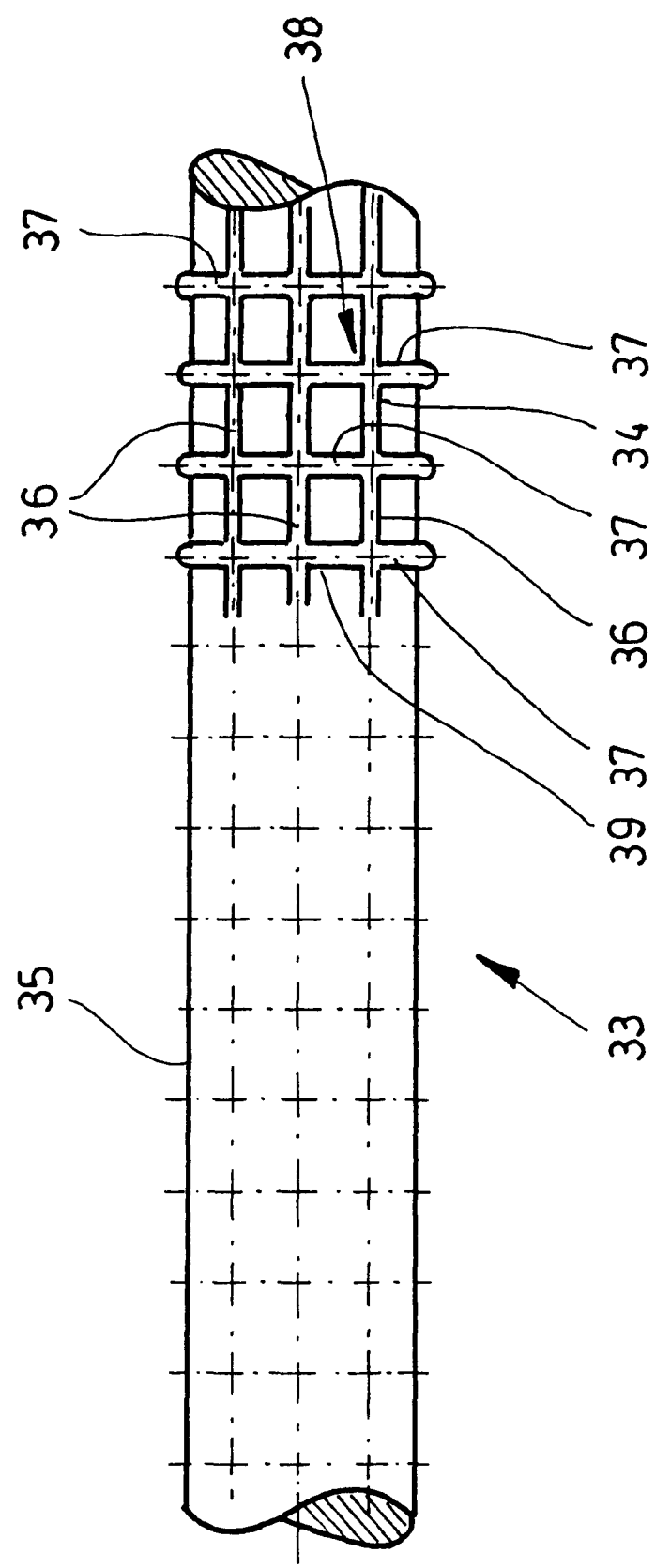
FIG. 7 shows a portion of a submarine cable according to a fifth exemplary embodiment of the invention.

FIG. 7 shows a submarine cable 33 in which the marking is formed by a netting 34. The netting 34 surrounds the outer sheath 35 of the submarine cable 33. In the exemplary embodiment shown, the netting is formed by longitudinal strands 36, extending in the longitudinal direction of the submarine cable 33, and transverse strands 37, directed transversely thereto, which surround the outer sheath 35 uninterruptedly. In the present case, the interval between pairs of neighbouring, parallel longitudinal strands 36 is approximately the same size as the interval between two neighbouring, parallel transverse strands 37. As a result, rectangular openings 38 are created between the longitudinal strands 36 and transverse strands 37. It is also possible, however, to choose the intervals between neighbouring longitudinal strands 36 to be less or greater than the intervals between neighbouring transverse strands 37. Similarly, the longitudinal strands may also extend obliquely with respect to the longitudinal axis of the submarine cable 33 or wrap around it in a serpentine manner. Such longitudinal strands are also joined by transverse strands, which, if appropriate, may extend obliquely with respect to the longitudinal axis of the submarine cable 33 in order that they intersect the longitudinal strips at right angles.

The longitudinal strands 36 and transverse strands 37 intersect at nodes 39. At these nodes 39, the longitudinal strands 36 are at the same time integrally joined to the transverse strands 37. The longitudinal strands 36 and the transverse strands 37 preferably have round cross sections of the same size.

The netting 34 is applied to the outer sheath 35 after the said sheath has been produced. For this purpose, after extrusion of the outer sheath 35 onto the core of the submarine cable 37, the netting 34 is extruded onto the outside of the outer sheath 35 in a second extrusion step.

The netting 34 and the outer sheath 35 are preferably formed from plastic, in particular an identical plastic. With regard to color, the netting 34 differs from the outer sheath 35. For example, the netting 34 is of a yellow color, if appropriate with fluorescent properties, while the outer sheath 35 is black. The openings 38 between the longitudinal strands 36 and the transverse strands 37 then appear black, while between neighboring openings 38 there is the yellow marking formed by the longitudinal strands 36 and the transverse strands 37.

As a departure from the exemplary embodiments shown, the markings may take any other desired form. For example, transverse strips, longitudinal strips which extend parallel to the longitudinal centre axis of the submarine cable or dots with square or non-round surface areas may be used. It is also conceivable to form the longitudinal strips or other strips by a row of dots following one another at short intervals or to interrupt the continuous longitudinal or transverse strips occasionally. In addition, it is conceivable to vary the number of longitudinal strips as desired or to combine longitudinal strips and dots with one another.

What is claimed is:

1. Underwater cable with a cable core having at least one conductor and an outer sheath, wherein:

a. the outer sheath has at least one externally visible marking;

b. the outer sheath has a color and the at least one marking has a color, wherein the color of the at least one marking is different from and stands out from the color of the outer sheath; and c. the at least one marking is formed by a plurality of spiral longitudinal strips that are provided adjacently to one another, the spiral longitudinal strips being assigned in such a way that at least some of the spiral longitudinal strips cross in certain regions.

2. Cable according to claim 1, characterized in that the at least one marking is formed by a multiplicity of two-dimensional formations.

3. Cable according to claim 2, characterized in that the two-dimensional formations are arranged in rows in the longitudinal direction in such a way that they form at least one interrupted spiral line around the outer sheath.

4. Cable according to claim 2, characterized in that the two-dimensional formations are arranged in a grid extending over the surface area of the outer sheath.

5. Cable according to claim 6, characterized in that the two-dimensional formations are distributed randomly on the outer sheath.

6. Cable according to claim 1, characterized in that the at least one marking is formed by dye applied externally to the outer sheath (11, 15, 25, 29).

7. Cable according to claim 1, characterized in that the at least one marking is formed during the production of the outer sheath (11, 15, 25, 29) from a material of a color differing from the color of the outer sheath (11, 15, 25, 29).

8. Cable according to claim 1, characterized in that the at least one marking, of a material of a different color, is applied to the surface of the outer sheath (11, 15, 25, 29) by extrusion.

9. Cable according to claim 1, characterized in that the at least one marking, of a material of a different color is applied to the surface of the outer sheath (11, 15, 25, 29) by sintering.

10. Cable according to claim 1, characterized in that the at least one marking is formed by a multiplicity of color particles mixed into the plastic material for producing the outer sheath (11, 15, 25, 29).

11. Cable according to claim 1, characterized in that the at least one marking is of a lighter color that the outer sheath (11, 15, 25, 29).

12. Cable according to claim 11, characterized in that the lighter color of the marking has reflective properties.

13. Cable according to claim 11, characterized in that the lighter color of the marking has fluorescent properties.

14. Cable according to claim 1, characterized in that the outer sheath (11, 15, 25, 29) is of a black color, and the at least one marking is of a yellow color.

15. Underwater cable with a cable core having at least one conductor and an outer sheath, wherein:

a. the outer sheath has at least one externally visible marking;

b. the outer sheath has a color and the at least one marking has a color, wherein the color of the at least one marking is different from and stands out from the color of the outer sheath; and c. the at least one marking is in the form of a netting surrounding the outer sheath.

* * * * *